United States Patent
Yoshikawa et al.

(10) Patent No.: US 10,335,780 B2
(45) Date of Patent: Jul. 2, 2019

(54) METHOD FOR REGENERATING DENITRIFICATION CATALYST

(71) Applicant: THE CHUGOKU ELECTRIC POWER CO., INC., Hiroshima-shi, Hiroshima (JP)

(72) Inventors: Toshikazu Yoshikawa, Hiroshima (JP); Kazuhiro Yoshida, Hiroshima (JP); Hiroshi Shimada, Hiroshima (JP); Misao Nobori, Osaka (JP); Atsushi Ito, Ichinomiya (JP); Fumihiro Miyake, Osaka (JP); Yuichiro Morizane, Osaka (JP); Hiroyuki Kagawa, Osaka (JP)

(73) Assignee: THE CHUGOKU ELECTRIC POWER CO., INC., Hiroshima (JP)

(*) Notice: Subject to any disclaimer, the term of this patent is extended or adjusted under 35 U.S.C. 154(b) by 0 days.

(21) Appl. No.: 14/780,894

(22) PCT Filed: Mar. 28, 2013

(86) PCT No.: PCT/JP2013/059382
§ 371 (c)(1),
(2) Date: Sep. 28, 2015

(87) PCT Pub. No.: WO2014/155628
PCT Pub. Date: Oct. 2, 2014

(65) Prior Publication Data
US 2016/0051976 A1    Feb. 25, 2016

(51) Int. Cl.
*B01J 38/00* (2006.01)
*B01D 53/94* (2006.01)
(Continued)

(52) U.S. Cl.
CPC .......... *B01J 38/00* (2013.01); *B01D 53/9409* (2013.01); *B01D 53/96* (2013.01); *B01J 35/04* (2013.01);
(Continued)

(58) Field of Classification Search
CPC ....... B01J 38/00; B01J 35/04; B01D 53/9409; B01D 53/96; B24C 3/065; B24C 9/006; Y02P 70/179
(Continued)

(56) References Cited

U.S. PATENT DOCUMENTS 3,981,685 A * 9/1976 Fennessy ............... B01J 15/005
                                                          422/178
4,102,980 A   7/1978 Sasaki et al.
(Continued)

FOREIGN PATENT DOCUMENTS

EP      0241310 A2    10/1987
JP      62-241555 A   10/1987
(Continued)

OTHER PUBLICATIONS

International Search Report for PCT/JP2013/059382 dated Jun. 25, 2013.
(Continued)

*Primary Examiner* — Jennifer A Smith
(74) *Attorney, Agent, or Firm* — Sughrue Mion, PLLC

(57) ABSTRACT

A method for regenerating an NOx removal catalyst, which includes connecting an upstream fixing member (10) to one end of a member to be ground, and connecting a downstream fixing member (20) to the other end; connecting a mixing part (40) for mixing an abrasive with a gas to an upstream portion of the upstream fixing member, and disposing a screen member in the expanded part, and connecting a classification part (70) and a dust-collecting part (80) to the (Continued)

downstream fixing member; and transferring the abrasive which has been mixed with the gas from the mixing part to the upstream fixing member, reducing the flow rate of the mixture in the expanded part, subsequently, causing the mixture to pass through the through-hole of the NOx removal catalyst and the downstream fixing member, and then collecting dust by means of the dust-collecting part via the classification part.

4 Claims, 9 Drawing Sheets

(51) Int. Cl.
    *B01D 53/96* (2006.01)
    *B01J 35/04* (2006.01)
    *B24C 3/06* (2006.01)
    *B24C 3/32* (2006.01)
    *B24C 9/00* (2006.01)

(52) U.S. Cl.
    CPC .............. *B24C 3/065* (2013.01); *B24C 3/327* (2013.01); *B24C 9/006* (2013.01); *Y02P 70/179* (2015.11)

(58) Field of Classification Search
    USPC ..................................................... 423/20–56
    See application file for complete search history.

(56) References Cited

U.S. PATENT DOCUMENTS

| | | | | |
|---|---|---|---|---|
| 5,391,356 | A | * | 2/1995 | Thorman ............ B01F 15/0264 34/582 |
| 2003/0224933 | A1 | * | 12/2003 | Kondo ................ B01D 53/885 502/439 |
| 2004/0001782 | A1 | * | 1/2004 | Kumar .................... B01J 23/44 422/180 |

FOREIGN PATENT DOCUMENTS

| | | | | |
|---|---|---|---|---|
| JP | 1-119343 A | | 5/1989 | |
| JP | 2-245241 A | | 10/1990 | |
| JP | 4-197451 A | | 7/1992 | |
| JP | 07-116523 A | | 5/1995 | |
| JP | 2000-325801 A | | 11/2000 | |
| JP | 2012-000693 A | | 1/2012 | |
| JP | 2014100658 A | * | 6/2014 | .......... B01J 35/0006 |

OTHER PUBLICATIONS

Extended European Search Report dated Dec. 15, 2016, from the European Patent Office in corresponding European Application No. 13880088.3.

* cited by examiner

METHOD FOR REGENERATING DENITRIFICATION CATALYST

CROSS REFERENCE TO RELATED APPLICATIONS

This application is a National Stage of International Application No. PCT/JP2013/059382 filed Mar. 28, 2013, the contents of all of which are incorporated herein by reference in its entirety.

TECHNICAL FIELD

The present invention relates to a method for regenerating an NOx removal catalyst employed in a flue gas NOx removal apparatus belonging to a thermal power plant or the like.

BACKGROUND ART

Conventionally, boilers belonging to thermal power plants employing, as a fuel, petroleum, coal, fuel gas, or the like, as well as various large-scale boilers, waste incineration apparatuses, and other apparatuses are generally equipped with a flue gas NOx removal apparatus. Such a flue gas NOx removal apparatus includes therein a plurality of NOx removal catalyst layers.

A typical NOx removal catalyst contains a carrier (e.g., $TiO_2$ or the like), an active component (e.g., $V_2O_5$), and a co-catalyst component (e.g., tungsten oxide or molybdenum oxide). These catalyst components are used as a complex oxide such as $VO_x$—$WO_y$—$TiO_2$ or $VO_x$—$MoO_y$—$TiO_2$.

Such an NOx removal catalyst is generally in the form of a honeycomb-shape catalyst or a plate-like catalyst. Examples of the honeycomb-shape catalyst include a coating-type catalyst produced by forming a honeycomb-shape substrate and coating the substrate with catalyst components; a kneading-type catalyst produced by kneading a catalyst substrate with catalyst components and forming the mixture into a honeycomb; and an impregnation-type catalyst produced by impregnating a honeycomb catalyst substrate with catalyst components. The plate-like catalyst is produced by coating a metallic core or a ceramic substrate with catalyst components.

In any case, when such an NOx removal catalyst is used continuously, a substance which deteriorates the performance of a catalyst (hereinafter referred to as a deteriorating substance) is deposited on or dissolved into the catalyst at the surface and inside thereof, thereby incidentally impairing the catalytic performance.

In order to solve the problem, studies have been conducted on a method of regenerating the NOx removal catalyst.

The conventionally studied countermeasures are based on physically removing deteriorated parts and contaminants, to thereby cause the active surface to be exposed. Specific examples include a technique in which the walls of exhaust gas flow paths are polished with an abrasive (see Patent Document 1), a technique in which a surface portion of a deteriorated NOx removal catalyst is ground, to thereby renew the catalytically active surface (see Patent Document 2), and a technique in which a gas containing microparticles is caused to pass through the through-holes of a catalyst, to thereby remove contaminants (see Patent Document 3).

PRIOR ART DOCUMENTS

Patent Documents

Patent Document 1: Japanese Patent Application Laid-Open (kokai) No. Hei 1-119343
Patent Document 2: Japanese Patent Application Laid-Open (kokai) No. Hei 4-197451
Patent Document 3: Japanese Patent Application Laid-Open (kokai) No. Hei 7-116523

SUMMARY OF THE INVENTION

Problems to be Solved by the Invention

However, the aforementioned physically grinding methods and the like must involve cumbersome operations and may cause self-breakage or damage of an NOx removal catalyst during the regeneration process, which is problematic. Another problem involved in the above methods is that the target catalyst cannot be uniformly ground along the flow path direction.

In view of the foregoing, an object of the present invention is to provide an NOx removal catalyst regeneration method which can uniformly grind the inner wall of a target catalyst without breaking the NOx removal catalyst.

Means for Solving the Problems

In a first mode of the present invention for attaining the aforementioned object, there is provided a method for regenerating an NOx removal catalyst, characterized in that the method comprises:

connecting an upstream fixing member to one end of a member to be ground which is formed of an NOx removal catalyst, the upstream fixing member including an expanded part which has a cross-sectional area larger than that of the member to be ground, and connecting a downstream fixing member to the other end of the member to be ground, the downstream fixing member including a flow path which has a fixed cross-sectional area over a predetermined length from a member to be ground-fixing end thereof;

connecting a mixing part for mixing an abrasive with a gas to an upstream portion of the upstream fixing member, by the mediation of a connecting member including a flow path which has a cross-sectional area smaller than that of the expanded part, and disposing a screen member having a predetermined sieve opening in the expanded part on the member-to-be-ground side, and connecting a classification part and a dust-collecting part to the downstream fixing member on the connecting member side, the classification part being adapted to separate the abrasive which has passed through the through-hole of the member to be ground from a ground matter generated through grinding by the abrasive, and the dust-collecting part being adapted to absorb the gas in the mixing part via the classification part; and transferring the abrasive which has been mixed with the gas from the mixing part, through suction by means of the dust-collecting part, to the upstream fixing member, reducing the flow rate of the mixture of the gas and the abrasive in the expanded part, to thereby temporarily retain the mixture in the expanded part, subsequently, causing the mixture to pass through the through-hole of the NOx removal catalyst and the downstream fixing member, to thereby grind the inner wall of the through-hole, and subsequently, collecting dust by means of the dust-collecting part via the classification part.

In the first mode, the mixture of the abrasive and the gas temporarily resides in the expanded part of the upstream fixing member on the NOx removal catalyst upstream side, while the flow rate of the mixture has decreased. When the mixture passes through the screen member, the flow rate decreases, and the mixture is scattered. Then, the mixture is transferred to the through-holes of the NOx removal catalyst through suction by the downstream fixing member including a flow path which has a fixed cross-sectional area over a predetermined length. Thus, the abrasive can be transferred, without breaking an end surface of the NOx removal catalyst, to all the through-holes disposed from the cross-sectional center to periphery consistently and uniformly at the same flow rate, whereby the inner wall of each through-hole can be uniformly ground.

A second mode of the present invention is directed to a specific embodiment of the NOx removal catalyst regeneration method of the first mode, wherein a regulating member for regulating the center of the flow path is disposed in the downstream fixing member on the classification part side.

According to the second mode, the flow rate at the radial center of the downstream fixing member is reduced by the regulating member. Thus, the abrasive can be transferred, without breaking an end surface of the NOx removal catalyst, to all the through-holes disposed from the cross-sectional center to periphery consistently and uniformly at the same flow rate, whereby the inner wall of each through-hole can be more uniformly ground.

A third mode of the present invention is directed to a specific embodiment of the NOx removal catalyst regeneration method of the first or second mode, wherein the member to be ground is an NOx removal catalyst to which a dummy cell is disposed around the outer surface of the catalyst.

According to the third mode, a dummy cell occupies an outer peripheral portion of the member to be ground, where the flow rate tends to decrease. Thus, only a central portion, where a uniform flow can be attained, can be ground, thereby attaining more uniform grinding performance.

A fourth mode of the present invention is directed to a specific embodiment of the NOx removal catalyst regeneration method of any one of the first to third modes, wherein the lower end of the member to be ground is fixed to the upstream fixing member, and the upper end of the member to be ground is fixed to the downstream fixing member, while the member to be ground is maintained in the upright position.

According to the fourth mode, the NOx removal catalyst is ground in the upright position. Thus, all through-holes can be uniformly ground.

Effects of the Invention

As described above, according to the NOx removal catalyst regeneration method of the present invention, the abrasive can be transferred, without breaking an end surface of the NOx removal catalyst, to all the through-holes disposed from the cross-sectional center to the periphery consistently and uniformly at the same flow rate, whereby the inner wall of each through-hole can be more uniformly ground, and uniform regeneration performance can be attained.

MODES FOR CARRYING OUT THE INVENTION

Hereinafter, the present invention will next be described in detail by way of an embodiment.

Embodiment 1

Figure 1:
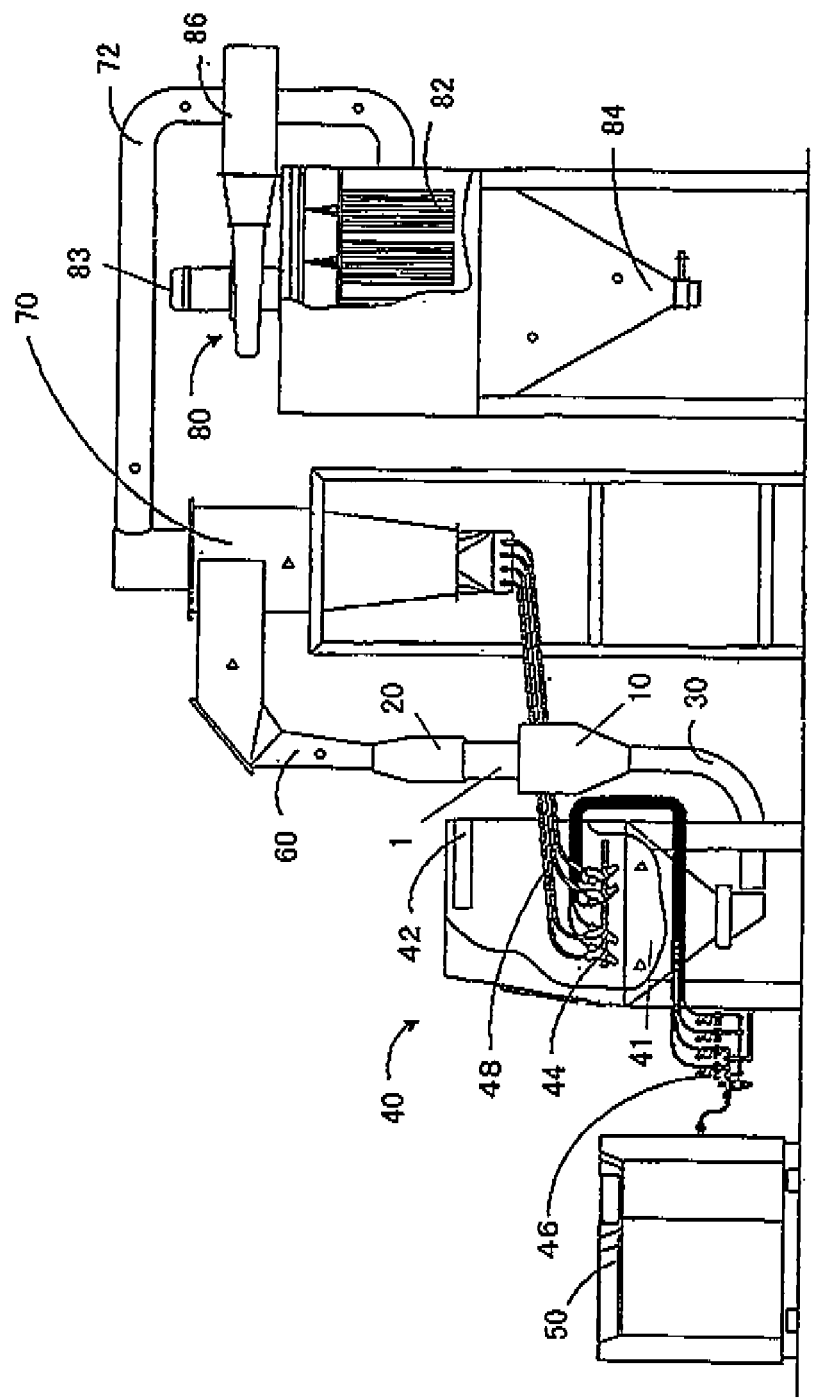
FIG. 1 schematic configuration of a grinding system for carrying out the NOx removal catalyst regeneration method according to Embodiment 1 of the present invention.
Figure 2:
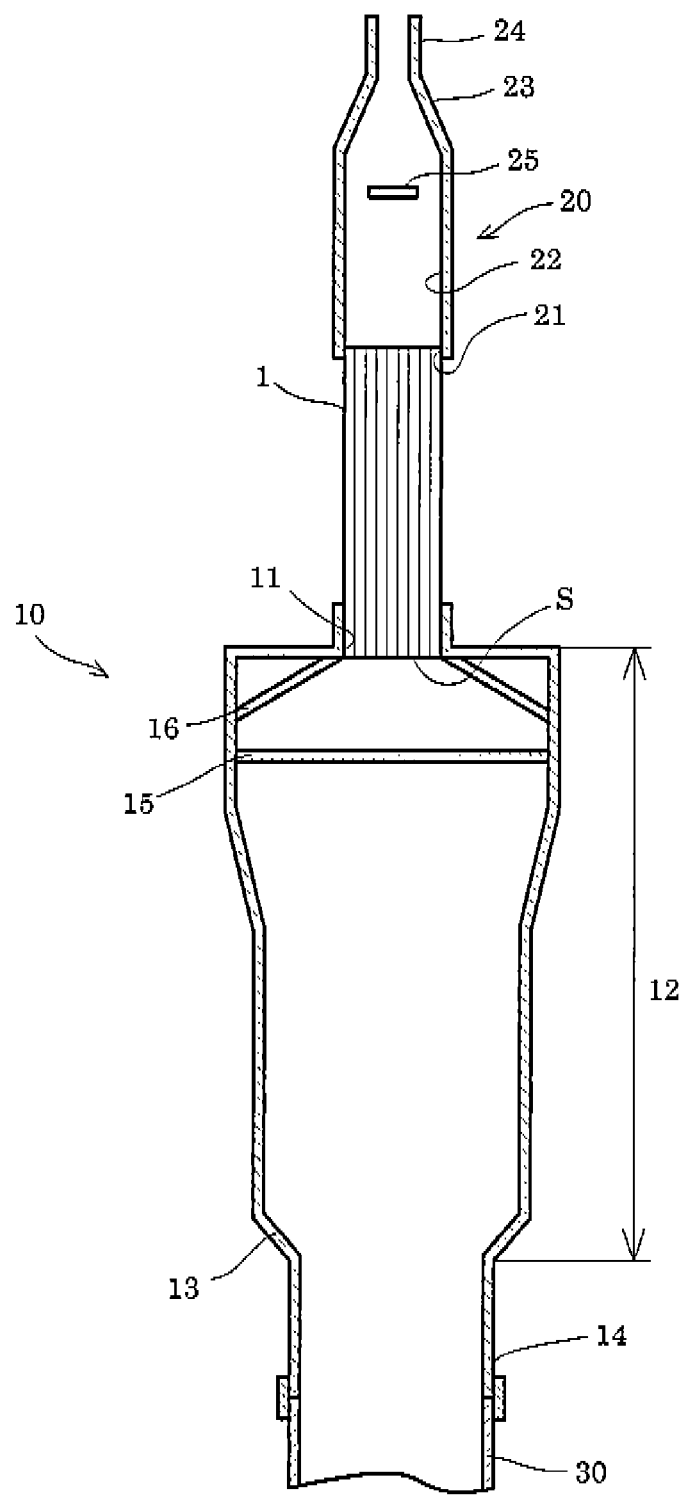
FIG. 2 A cross-section of a main part of FIG. 1.

FIG. 1 is a schematic configuration of a grinding system employed in Embodiment 1, and FIG. 2 is a cross-section of a main part of FIG. 1.

As shown in the drawings, an NOx removal catalyst 1, which has been used in a flue gas NOx removal apparatus or the like and which serves as a member to be ground, is fixed upright between an upstream fixing member 10 and a downstream fixing member 20. To the upstream fixing member 10, a mixing part 40 is connected via an upstream connecting member 30, and a compressor 50 is connected to the mixing part 40. To the downstream fixing member 20, a classification part 70 is connected via a downstream connecting member 60, and a dust-collecting part 80 is connected to the classification part 70.

The upstream fixing member 10 has a fixing part 11 that can fix the lower end of the NOx removal catalyst 1. The fixing part 11 has almost the same cross-sectional area as that of the NOx removal catalyst 1. The upstream fixing member 10 has, on the upstream side of the fixing part 11, an expanded part 12 whose cross-sectional area is considerably widen. The upstream fixing member 10 has, on the upstream side of the expanded part 12, a tapered part 13 having a gradually decreasing cross-sectional area, and a connecting part 14 which connects to the tapered part 13 having almost the same cross-sectional area as the smaller cross-sectional area of the tapered part 13. To the connecting part 14, one end of the upstream connecting member 30 is connected, and the other end of the upstream connecting member 30 is connected to the outlet of the mixing part 40. Notably, each of the flow paths belonging to the upstream fixing member 10 may have a rectangular or circular cross section, and the cross-sectional shape may vary at any location.

In the upstream fixing member 10 disposed is a screen member 15 having a predetermined sieve opening. The screen member 15 is formed of a mesh having a predetermined sieve opening and disposed in the expanded part 12 on the NOx removal catalyst 1 side, so that the flow from the upstream connecting member 30 to the expanded part 12 is restricted.

In the expanded part 12 on the fixing part 11 side disposed is a straightening vane 16, which is a conical or pyramidal tapered part, so that the flow from the expanded part 12 to the fixing part 11 is regulated.

The downstream fixing member 20 has a fixing part 21 that can fix the upper end of the NOx removal catalyst 1; a straight-tubular part 22 which forms a flow path having a fixed cross-sectional area from the fixing part 21 to a predetermined height; and a tapered part 23 which is connected to the straight-tubular part 22 and which has a gradually decreasing cross-sectional area, and a connecting part 24 which is connected to the tapered part 23. To the connecting part 24, the downstream connecting member 60 is connected.

In the downstream fixing member 20 on the classification part 70 side; more specifically, in the straight-tubular part 22 of the downstream fixing member 20, there is disposed a regulating member 25 for regulating the flow at the center of the flow path. No particular limitation is imposed on the position of disposing the regulating member 25 along the flow direction, so long as the regulating member is placed at the center of the flow path, at which the flow speed is the maximum. Thus, the regulating member 25 may be disposed in the straight-tubular part 22 on the tapered part 23 side or on the NOx removal catalyst 1 side, or at the interface between the tapered part 23 and the straight-tubular part 22. No particular limitation is imposed on the shape of the regulating member 25. However, since the member 25 regulates the flow at the center of the tubular part, a shape similar to the cross section of the NOx removal catalyst 1 is preferred. Also, the regulating member 25 may completely intercept the flow, or may intercept a large portion of the flow but allow passage of a part thereof. For example, the member 25 may be a mesh member.

The mixing part 40 has a generally funnel-shape space 41 at the center thereof and an air inlet 42 for taking outside air thereinto at an upper part thereof. The bottom of the generally funnel-shape space 41 is connected to the upstream connecting member 30 in a sealed manner. In the mixing part 40 are disposed a plurality of (e.g., 4 to 10; 6 in Embodiment 1) sandblast guns 44. The injection port of each sandblast gun 44 is directed toward the slope in the generally funnel-shape space 41. The sandblast guns 44 are connected to the compressor 50 via air-regulators 46 and to abrasive hoses 48, respectively. In operation of the sandblast guns 44, the compressed air fed through the compressor 50 is pressure-regulated so as to have a pressure of interest by means of the air-regulators 46 and fed to the sandblast guns 44. As a result, an ejector effect is generated, whereby the abrasive is fed from the classification part 70. In each sandblast gun 44, the abrasive and compressed air are uniformly mixed, and the mixture is jetted in the mixing part 40. The thus-jetted compressed air including the abrasive is intermingled with air taken through the air inlet 42, and the mixture is transported to the upstream fixing member 10 via the upstream connecting member 30.

The classification part 70 is a known cyclone classifier and is disposed at a position higher than that of the mixing part 40. The classification part 70 is connected to the downstream fixing member 20 via the downstream connecting member 60, to the dust-collecting part 80 via the feed pipe 72, and to the sandblast guns 44 via the abrasive hoses 48, respectively, in a sealed manner.

Air entraining the abrasive and ground powder dust and being transported to the classification part 70 through the downstream connecting member 60 is separated into the abrasive and the ground powder dust-containing air by means of the classification part 70. The thus-separated abrasive falls toward the bottom of the classification part 70 by its self-weight and is deposited. The deposited abrasive is fed again to the sandblast guns 44 via the abrasive hoses 48. In this case, since the portions of the abrasive hoses 48 in the classification part 70 are located at a level higher than that of the portions of the abrasive hoses 48 on the sandblast gun 44 side, when the abrasive is fed to the sandblast guns 44, the ejector effect can be fully utilized, even when the compressed air provided by the compressor 50 is of low pressure. Notably, the abrasive hoses 48 are preferably disposed such that they are short and in a stretched state. Under such conditions, the ejector effect can be fully utilized. Meanwhile, powder dust-entraining air is transported to the dust-collecting part 80 via the feed pipe 72.

The dust-collecting part 80 is a known dust-collecting apparatus. This dust-collecting part 80 is connected to the classification part 70 via the feed pipe 72 in a sealed manner. In the dust-collecting part 80, there is disposed a blower motor 83 that can modulate the rotation rate with respect to that of the cartridge filter 82, whereby powder dust contained in air can be collected. The powder dust collected by means of the cartridge filter 82 is periodically shaken off through pulse jet and then can be stored at any timing in a storage part 84 disposed at the bottom of the conical portion. Meanwhile, the purified air which has been passed through the cartridge filter 82 is exhausted to the atmosphere via an exhaust duct.

Next will be described a method for regenerating the NOx removal catalyst 1 by means of the aforementioned grinding system.

The NOx removal catalyst 1 is a honeycomb catalyst formed of a honeycomb structure of a columnar, a generally elliptic-cylindrical, a polygonal-prismatic, or a quadritic-prismatic shape, having therein a plurality of through-holes penetrating the honeycomb structure along the longitudinal direction and being arranged in a lattice. Principally, the NOx removal catalyst 1 is a used one and thus has deposits on the inner wall of each through-hole. In some cases, at least a part of the through holes are clogged by (coal) ash. In such a case, preferably, the clogged portions are removed through washing with water or a similar technique, and then the honeycomb catalyst is set in the grinding system.

After setting of the NOx removal catalyst 1, the sandblast guns 44 are operated through controlling the air-regulators 46 so as to control pressure to a specific level, and the blower motor 83 of the dust-collecting part 80 is operated, whereby an abrasive is jetted with air through the sandblast guns 44. The mixture of the abrasive and air jetted through the injection ports of the sandblast guns 44 passes through the upstream connecting member 30 to the upstream fixing member 10.

The flow of the mixture which has entered the upstream fixing member 10 and has been transported to the expanded part 12 via the tapered part 13 is retarded and temporarily remains for a very short period in the expanded part 12. At the moment, the flow direction of the mixture is rearranged. Furthermore, the mixture collides to the screen member 15 and passes through the screen member 15 while being scattered toward multiple directions, whereby the flow of the mixture on the downstream side of the screen member 15 in the expanded part 12 is further rearranged.

Meanwhile, a pressure difference is provided between the upstream side and the downstream side of the NOx removal catalyst 1 through suctioning by the dust-collecting part 80. Therefore, the mixture temporarily remaining in the expanded part 12 is withdrawn by the dust-collecting part 80 and transferred into the through-holes of the NOx removal catalyst 1. As a result, breakage of the upstream end of the NOx removal catalyst 1 can be suppressed to a maximum degree. Also, the abrasive can be supplied, at a uniform amount and flow rate, to all the through-holes provided across the cross-section of the NOx removal catalyst 1 (from the center to the periphery), whereby the inner walls of all the through-holes can be uniformly ground.

To describe in more detail, in order to prevent breakage of the end surface of the NOx removal catalyst 1 and to perform uniform grinding, the flow rate of the mixture in the expanded part 12 of the upstream fixing member 10 must be minimized. As described above, provision of the expanded part 12 and the screen member 15 results in rearrangement of the flow and reduction in flow rate, to thereby attain a uniform flow.

The cross-sectional area of the expanded part 12 of the upstream fixing member 10 is preferably about 3 to about 10 times the cross-sectional area S of the NOx removal catalyst 1. The volume of the upstream fixing member 10 is preferably adjusted to about $(\sqrt{((3\sim10)\times S)})^3$.

The formula $(\sqrt{((3\sim10)\times S)})^3$ denotes the following formula.

$$(\sqrt{(3\sim10)\cdot S})^3 \quad [F1]$$

The sieve opening of the screen member 15 may be adjusted to such a level that the flow of the mixture is caused to be scattered through collision so as to attain a rearranged state. The sieve opening may be, for example, #8 to #40.

In a preferred mode, the mixture whose flow has been rearranged in the expanded part 12 of the upstream fixing member 10 is withdrawn into the through-holes of the NOx removal catalyst 1 by the pressure difference between the downstream fixing member 20 and the upstream fixing member 10 (i.e., between the inlet and the outlet of the NOx removal catalyst 1). The pressure in the downstream fixing member 20 is preferably adjusted such that the pressure is lower than the pressure in the upstream fixing member 10 by 4 to 8 kPa.

For grinding the NOx removal catalyst 1 as uniformly as possible along the cross-sectional direction, the straight-tubular part 22 of the downstream fixing member 20 preferably has a sufficient length. In the straight-tubular part 22 having no variation in cross-sectional area along the flow direction, a large flow rate can be attained in the cross-sectional center. Also, the straight-tubular part 22 is connected, via the tapered part 23, to the connecting part 24 having a smaller cross-sectional area. Therefore, the flow at the center may be further strengthened in a space in the vicinity of the tapered part 23. Under the above conditions, the center portion of the NOx removal catalyst 1 is more readily ground. Thus, in Embodiment 1, a square-plate regulating member 25 is disposed inside the straight-tubular part 22 at the radial center portion thereof. By virtue of the regulating member 25, the flow at the center is regulated, and a uniform flow rate can be provided along the radial direction in the NOx removal catalyst 1, whereby the NOx removal catalyst 1 can be ground uniformly. The regulating member 25 preferably has a surface area which is ¼ to ½ the cross-sectional area of the NOx removal catalyst 1, more preferably about ⅓. Notably, the plan-view shape of the regulating member 25 is preferably similar to the cross-sectional area of the NOx removal catalyst 1. However, this shape is not limited thereto, and a circular shape or the like may be employed.

The abrasive is preferably made of a ceramic material such as alumina, silicon carbide, zirconia, or zircon. In order to prevent breakage of the end surface of the NOx removal catalyst 1 to a maximum degree, the abrasive preferably has a mesh size of #16 to #80.

Embodiment 2

Figure 3:
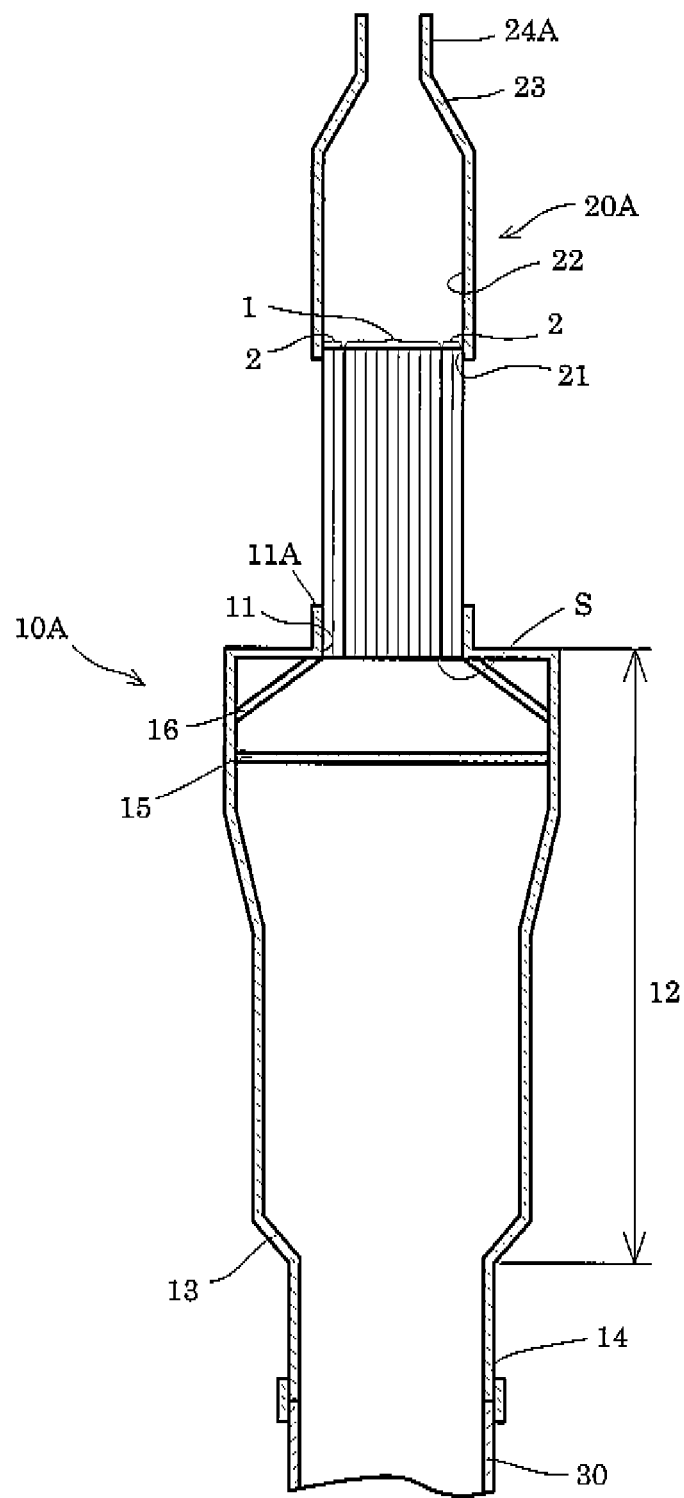
FIG. 3 A cross-section of a main part of a grinding system for carrying out the NOx removal catalyst regeneration method according to Embodiment 2 of the present invention.
Figure 4:
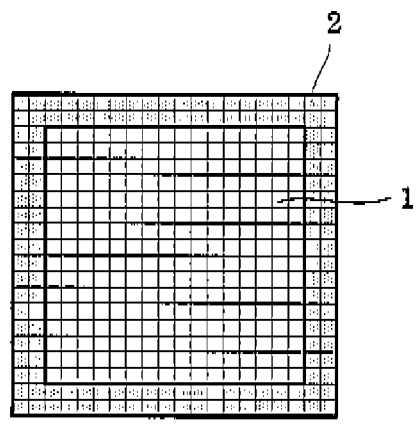
FIG. 4 A cross-section of a member to be ground of FIG. 3.

FIG. 3 shows a cross-section of a main part of a grinding system employed in Embodiment 2, and FIG. 4 shows a cross-section of a member to be ground of FIG. 3. Notably, the grinding system of Embodiment 2 is almost the same as that of Embodiment 1, except that the member to be ground has been changed. Thus, the members having the same actions are denoted by the same reference numerals, and overlapping descriptions are omitted.

As shown in FIGS. 3 and 4, the member to be ground which is employed in Embodiment 2 is an NOx removal catalyst 1 to which a dummy cell 2 is attached so as to surround the catalyst. The dummy cell 2 has through-holes which are the same as or similar to those of the NOx removal catalyst 1 and is disposed outside thereof in a radial direction. No particular limitation is imposed on the material of the dummy cell 2, so long as the material has wear resistance. For example, there may be employed the same ceramic material as that of the NOx removal catalyst 1, or a metallic material.

The upstream fixing member 10A and the downstream fixing member 20A are the same as those of Embodiment 1, except that the fixing members have connecting parts 11A and 24A having a large scale adapted far the member to be ground including the dummy cell 2, and that no regulating member 25 is disposed.

In Embodiment 2, the flow of the mixture of the abrasive and air from the upstream fixing member 10A toward the downstream fixing member 20A via the member to be ground is regulated such that the NOx removal catalyst 1 is placed at the center of the flow, where no substantial variation in flow rate exists. In contrast, the flow of the mixture at the periphery thereof, where the flow rate tends to decrease, passes through the dummy cell 2. As a result, the grinding condition of the NOx removal catalyst 1 along the cross-section can be further uniform.

The wider the area of the dummy cell 2, the more uniform the grinding condition. However, in this case, the flow rate must be increased for the increased area of the dummy cell 2, thereby impairing efficiency and increasing cost.

Thus, the cross-sectional area of the dummy cell 2 is adjusted to 30% or less the cross-sectional area of the NOx removal catalyst 1, preferably about 5 to about 15%, so that the satisfactory effect can be attained.

Test Example 1

A honeycomb NOx removal catalyst 1 having an outer cross-section area (150 mm×150 mm), a length of 860 mm, and a sieve opening of 6 mm and provided with 400 through-holes each having a rectangular cross-section (6 mm×6 mm) arranged at pitches of 7 mm was placed in the aforementioned grinding system of Embodiment 1. The honeycomb catalyst was ground with alumina (sieve opening: #46) serving as an abrasive at a target grinding amount of 100 μm. The NOx removal catalyst 1 received a pressure difference of 5.4 kPa between the upstream fixing member and the downstream fixing member.

Figure 5:
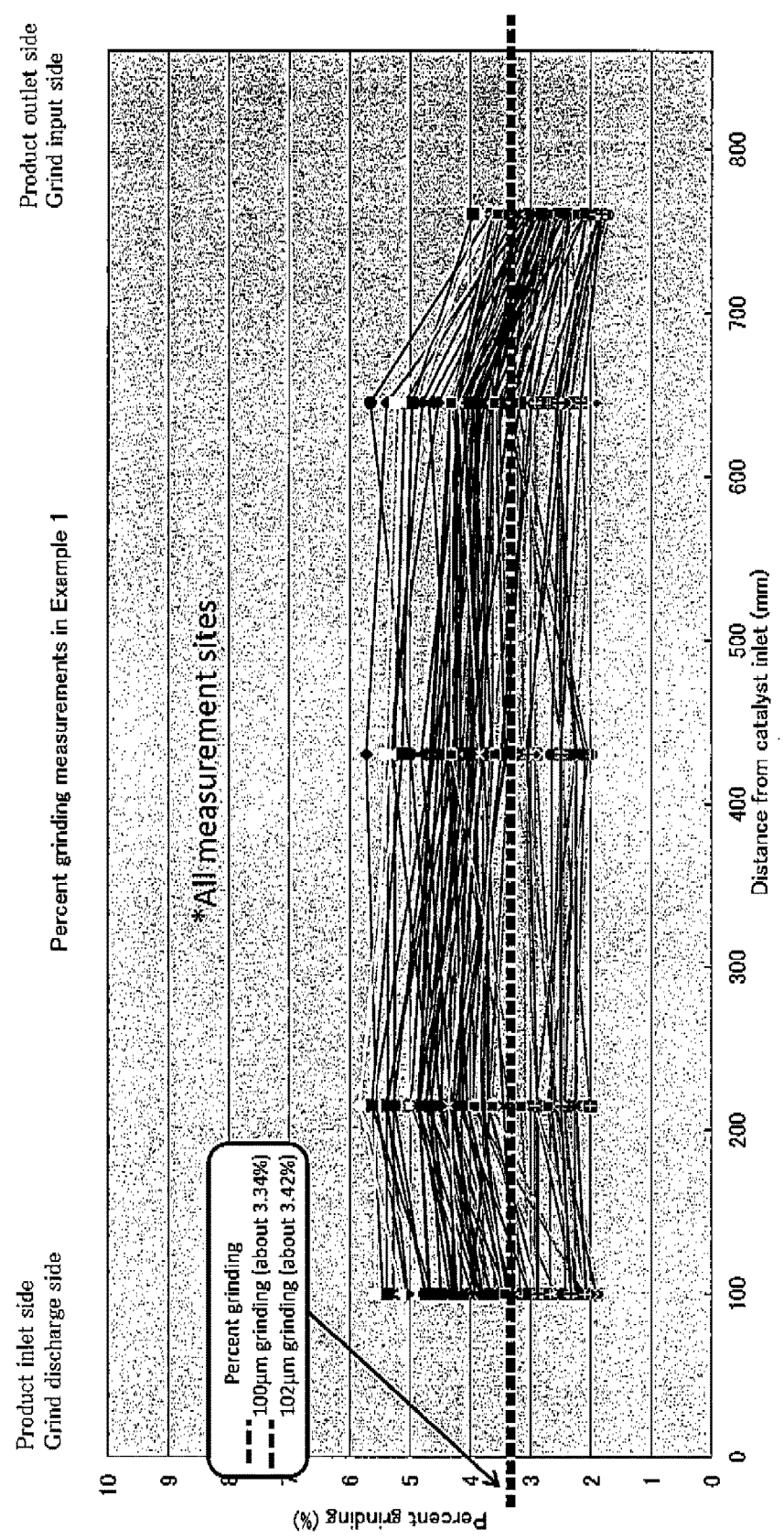
FIG. 5 A graph showing the test results of Example 1.

After completion of grinding, percent grinding was measured at 83 predetermined through-holes of the NOx removal catalyst. The measurement was performed at a plurality of sites along the longitudinal direction in each through hole. FIG. 5 shows the results as a line graph. Each line in the graph shows the results of the corresponding through-hole (Example 1). As is clear from the graph, variations among the lines mean variations in grinding amount along the cross-sectional direction, and variation in one line along the longitudinal direction refers to variation in grinding amount along the longitudinal direction. Notably, grinding was performed by feeding the abrasive from the outlet of the NOx removal catalyst 1. In the graph, the distance from the catalyst inlet denotes the distance from the abrasive discharge side.

The "percent grinding" is defined by the following formula. A target grinding amount of 100 µm corresponds to a percent grinding of 3.34%.

Percent grinding=[(sieve opening after grinding−sieve opening before grinding)/(sieve opening before grinding)]×100

The percent reduction due to grinding, calculated from the entire weight of the catalyst of Example 1 before and after grinding, was 12.23%. The substantial grinding amount obtained from the percent reduction was 102 µm.

Figure 6:
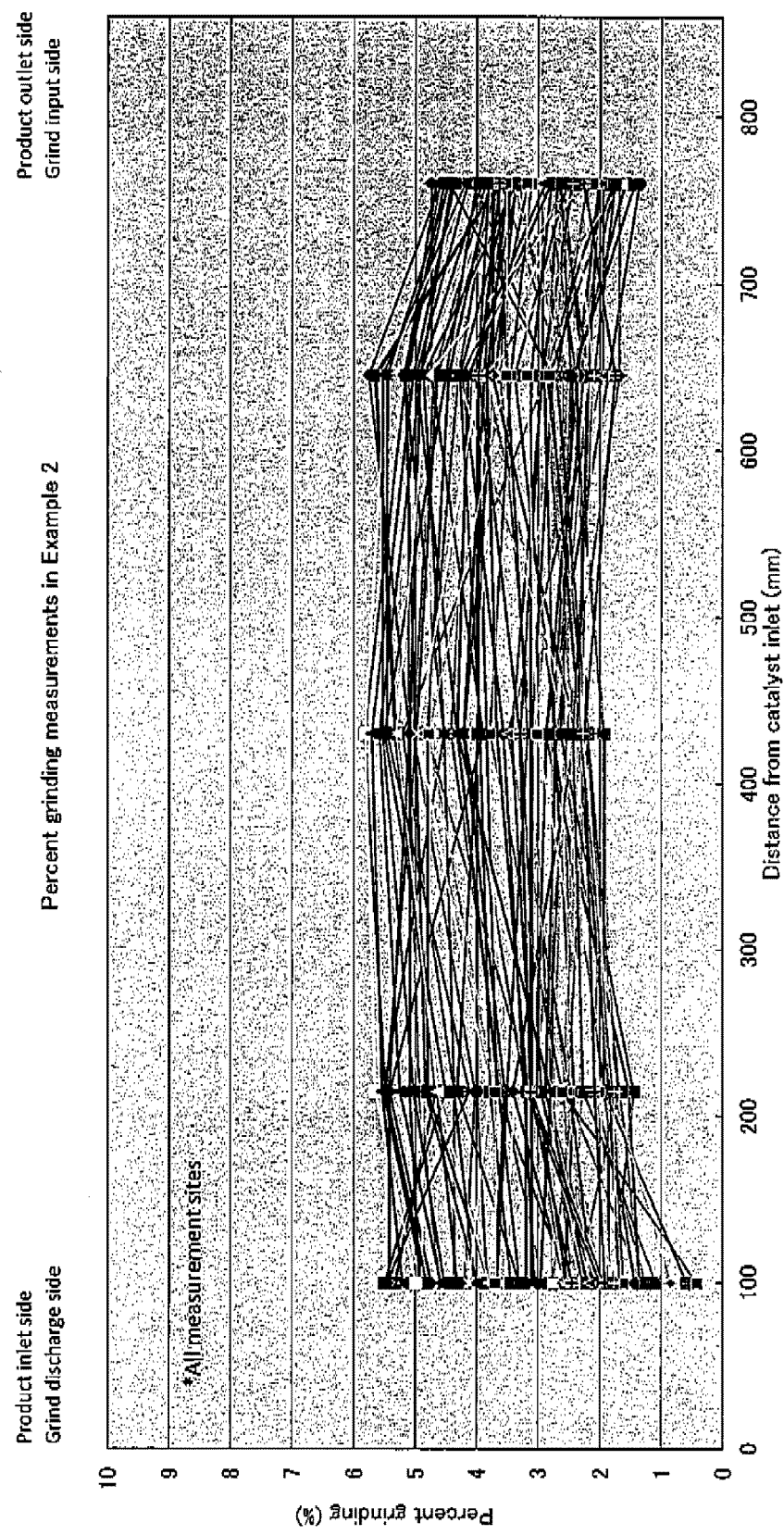
FIG. 6 A graph showing the test results of Example 2.

The same test was repeated, except that the regulating member 25 was removed from the grinding system (Example 2). FIG. 6 shows the results. The percent reduction due to grinding in Example 2 was 100 µm.

Figure 7:
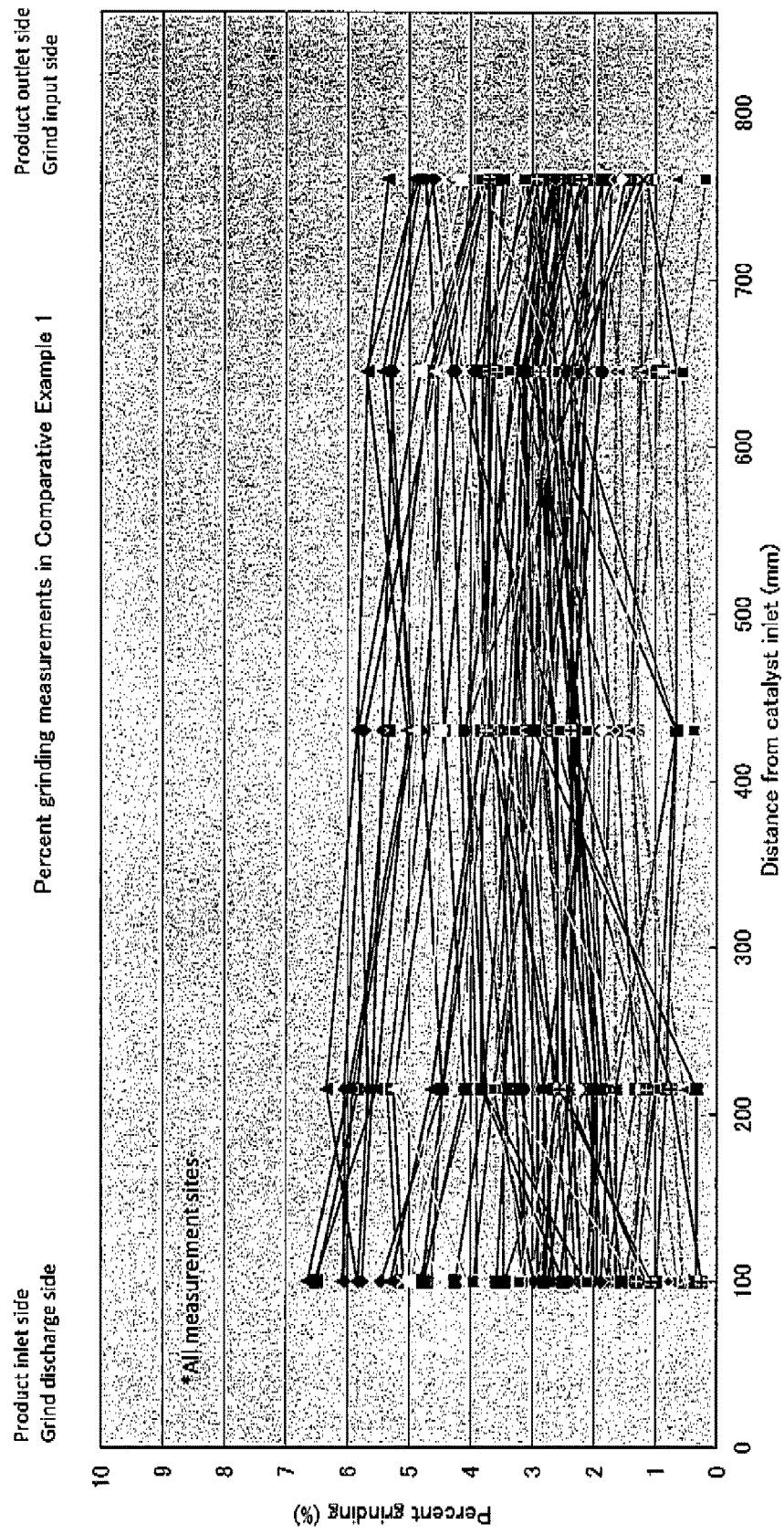
FIG. 7 A graph showing the test results of Comparative Example 1.
Figure 8:
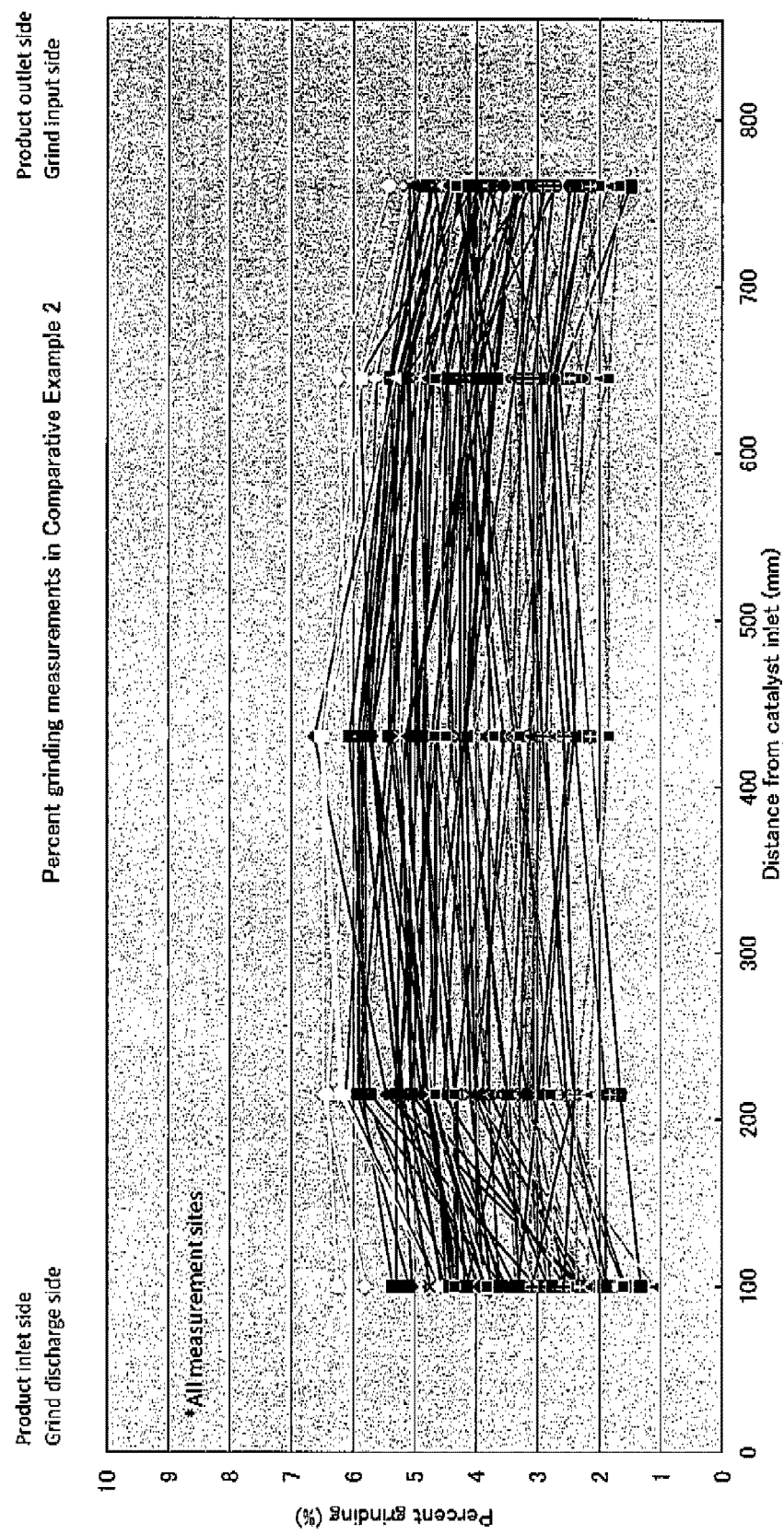
FIG. 8 A graph showing the test results of Comparative Example 2.

For comparison, the same test was performed when both the screen member 15 and the regulating member 25 were removed (Comparative Example 1), and when only the screen member 15 was removed (Comparative Example 2). FIGS. 7 and 8 show the results, respectively.

As is clear from the graphs, Comparative Example 1 in which both the screen member 15 and the regulating member 25 were removed, and Comparative Example 2 in which only the screen member 15 was removed showed larger variation in percent grinding amount over the distance of the catalyst length of along the radial direction, as compared with Embodiment 1 in which both the screen member 15 and the regulating member 25 were disposed and Example 2 in which the regulating member 25 was removed.

Thus, the screen member 15 and the regulating member 25 were found to have a great effect of reducing the variation in the radial direction.

Test Example 2

The procedure of Test Example 1 was repeated by means of the same grinding system as employed in Embodiment 2, except that a dummy cell 2 was disposed uniformly around the radially outside of the same NOx removal catalyst 1 as employed in Test Example 1 at a cross-sectional area of 10%, to thereby provide a member to be ground, and the regulating member 25 was removed.

Figure 9:
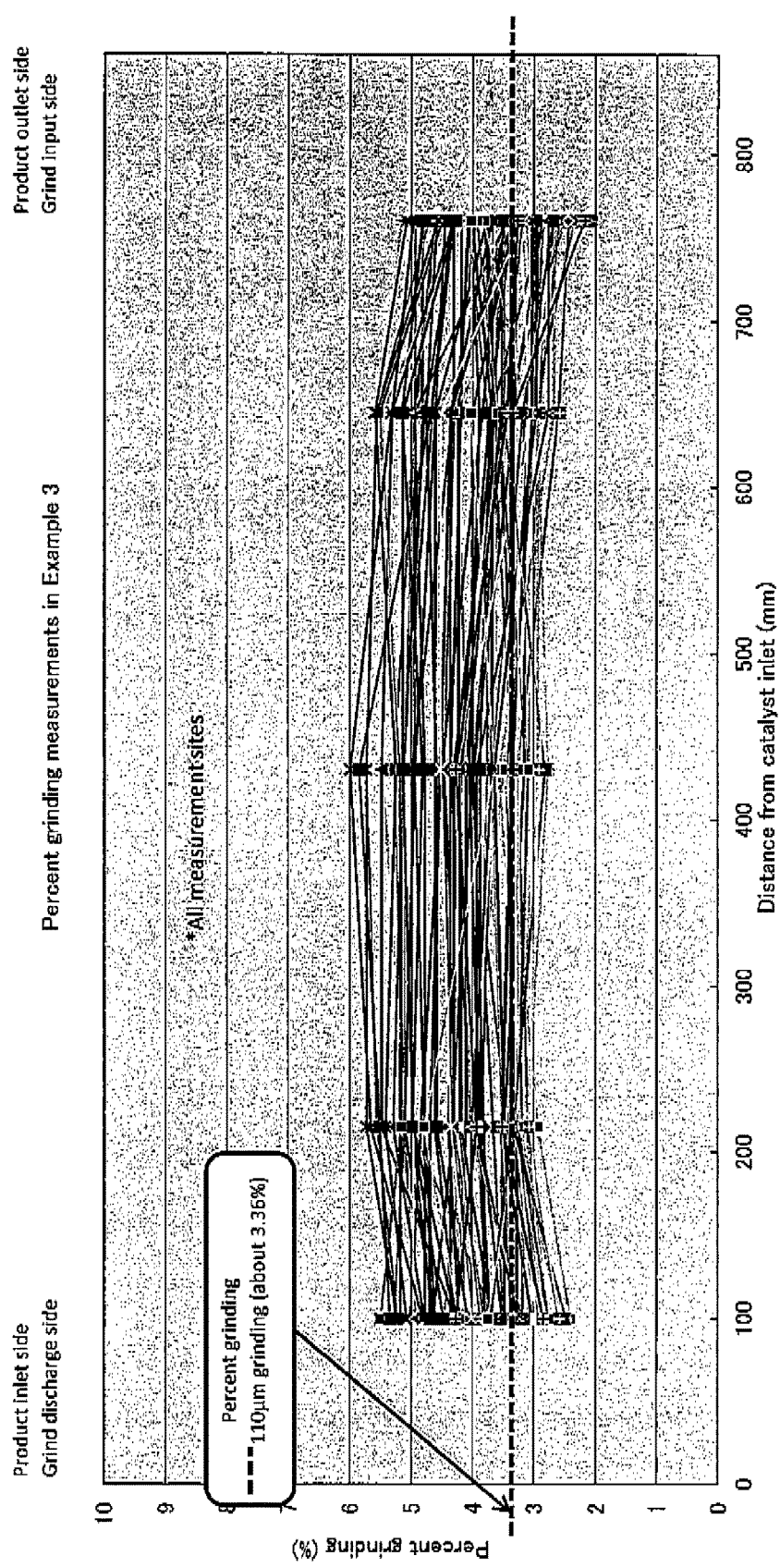
FIG. 9 A graph showing the test results of Example 3.

After completion of grinding, percent grinding was measured at 83 predetermined through-holes of the NOx removal catalyst. The measurement was performed at a plurality of sites along the longitudinal direction in each through hole. FIG. 9 shows the results as a line graph. Each line in the graph shows the results of the corresponding through-hole (Example 3).

Through comparison of the results with those of Example 2 (FIG. 6), variation in grinding amount along the radial direction was found to be considerably reduced by virtue of provision of the dummy cell 2.

INDUSTRIAL APPLICABILITY

The present invention can be applied to an NOx removal catalyst of a fume gas denitrification apparatus and to a ceramic honeycomb catalyst used in a boiler or the like.

DESCRIPTION OF REFERENCE NUMERALS

1 NOx removal catalyst
10 upstream fixing member
20 downstream fixing member
30 upstream connecting member
40 mixing part
50 compressor
60 downstream connecting member
70 classification part
80 dust-collecting part

The invention claimed is:

1. A method for regenerating an NOx removal catalyst, characterized in that the method comprises:
    mixing an abrasive with a gas in a mixing part connected to an upstream portion of an upstream fixing member, by the mediation of an upstream connecting member, wherein the upstream fixing member is connected to one end of a member to be ground which is formed of an NOx removal catalyst, the upstream fixing member includes an expanded part which has a cross-sectional area larger than that of the NOx removal catalyst and has a screen member having a predetermined sieve opening of #8 to #40 disposed in the expanded part on the NOx removal catalyst side, the upstream connecting member includes a flow path which has a cross-sectional area smaller than that of the expanded part,
    transferring the abrasive which has been mixed with the gas from the mixing part, through suction by a dust-collecting part, to the upstream fixing member,
    reducing the flow rate of the mixture of the gas and the abrasive in the expanded part, to thereby temporarily retain the mixture in the expanded part,
    subsequently, causing the mixture to pass through through-holes of the NOx removal catalyst and a downstream fixing member, to thereby grind the inner walls of the through-holes, and
    subsequently, collecting dust by the dust-collecting part via a classification part,
    wherein the downstream fixing member is connected to the other end of the NOx removal catalyst, the downstream fixing member including a flow path which has a fixed cross-sectional area over a predetermined length from a fixing end of NOx removal catalyst, and
    the classification part and the dust-collecting part are connected to a downstream portion of the downstream fixing member, by the mediation of a downstream connecting member connected to a connecting part which is located on the downstream portion of the downstream fixing member and has a cross-sectional area smaller than the fixed cross-sectional area of the downstream fixing member, the classification part being adapted to separate the abrasive which has passed through through-holes of the NOx removal catalyst from a ground matter generated through grinding by the abrasive, and the dust-collecting part being adapted to absorb the gas in the mixing part via the classification part, and
    wherein the member to be ground comprises an NOx removal catalyst and a dummy cell having a separate body which does not belong to the NOx removal catalyst for regenerating and is disposed around the outer surface of the catalyst, and the dummy cell has through-holes where the mixture is to be passed.

2. An NOx removal catalyst regeneration method according to claim 1, wherein a regulating member for regulating the center of the flow path is disposed selectively at the cross-sectional center of a tube in the downstream fixing member on the classification part side.

3. An NOx removal catalyst regeneration method according to claim 1, wherein the lower end of the NOx removal catalyst is fixed to the upstream fixing member, and the upper end of the NOx removal catalyst is fixed to the downstream fixing member, while the NOx removal catalyst is maintained in the upright position.

4. An NOx removal catalyst regeneration method according to claim 2, wherein the lower end of the NOx removal catalyst is fixed to the upstream fixing member, and the upper end of the NOx removal catalyst is fixed to the downstream fixing member, while the NOx removal catalyst is maintained in the upright position.

* * * * *